Figure 1:
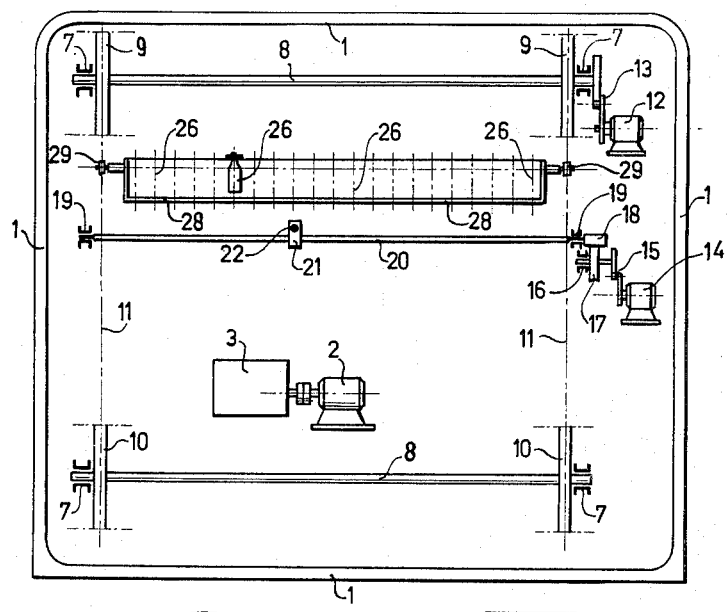

Feb. 8, 1966 M. VAN DER GRAAF 3,233,640
APPARATUS FOR FILLING SAMPLING BOTTLES
Filed Sept. 27, 1963

United States Patent Office 3,233,640
Patented Feb. 8, 1966

3,233,640
APPARATUS FOR FILLING SAMPLING BOTTLES
Matthijs van der Graaf, Sneek, Netherlands, assignor to W. Hubert & Co. Machinefabriek N.V., Sneek, Netherlands, a Dutch limited-liability company
Filed Sept. 27, 1963, Ser. No. 312,138
Claims priority, application Netherlands, Sept. 28, 1962, 283,781
4 Claims. (Cl. 141—130)

This invention relates to apparatus for filling sampling bottles with a perishable liquid.

In many cooperative dairies samples are taken from the milk furnished by the member farmers. More particularly, a small specific quantity of the milk furnished each day by each farmer is taken as a sample and deposited into a sampling bottle for each farmer. Usually, after a period of fourteen days, all bottles, each of which contains the total of the samples collected in fourteen days from a particular farmer, are then transferred to a laboratory where the fat content of the milk collected in each sampling bottle and the quality thereof is determined. The fat content is one of the conditions of remuneration to be paid to the farmer for the milk which he has supplied. It is of course obvious that the more accurately the sampling bottles and the contents thereof are dealt with, the more accurate will be the basis for the remuneration.

In heretofore known arrangements a ring carries 36 or 72 sampling bottles arranged in a circle. The ring is mounted on a vertical driving shaft. As a result of intermittent rotation of this ring, each sampling bottle comes successively beneath a sample extracting device which removes a milk sample from a collecting container which contains a quantity of milk produced by a certain farmer. Since there are usually hundreds of member farmers for each dairy, many rings with sampling bottles are necessary. Furthermore, since the extracted samples must be stored in refrigerated chambers to prevent their becoming spoiled, the rings must be removed from the refrigerated chambers when they are to be fed with further samples and then once again returned to the refrigeration chambers after the sampling is completed.

The heretofore known arrangements have many disadvantages. The bottles are not sealed. When the rings are conveyed from the refrigeration chamber for filling the sample bottles, they remain a relatively long time out of the refrigerated chamber and the temperature of the samples in the bottles is raised. As a consequence, there is evaporation, whereby the fat content of the previous samples is changed. In addition, these changing temperatures contribute to spoilage of the contents in the bottles. Furthermore, dust and dirt can easily enter the bottles and become mixed with the contents. The above all have the effect of disrupting the accuracy of the measurements of the contents of the sample bottles.

The invention is concerned with providing an arrangement of the type referred to which obviates all the said disadvantages.

It is an object of the invention to provide improved apparatus for the filling and storage of bottles with liquid samples.

According to the invention, there is contemplated apparatus comprising a box which preferably can be sealed in air-tight manner and having at least one closable inlet. Said box has arranged therein one or more conveyors for the sampling bottles and also one or more sample extracting devices. The sampling bottles receive samples by way of a supply device introduced from outside the box and in air-tight manner through the wall of the latter.

The box may also be advantageously provided with a refrigeration unit. Additionally, at least one of the closable inlets can be provided with an inspection window for furnishing visibility when the box is closed.

This arrangement according to the invention has many advantages. The empty sampling bottles are introduced at the commencement of a period into the refrigerated box and they remain in the box which is sealed as long as the collection period lasts. Observations during the filling operation can be made through the inspection window. All inlets can be provided with special locks so that no access to any of the bottles is possible without supervision of the key holder. Meddling with the contents is thereby excluded. Since the bottles no longer have to be conveyed daily from the separate refrigeration chamber for filling, the aforementioned disadvantages associated with such an arrangement are completely avoided. In addition, because the box remains sealed throughout the entire collection period, it is now sufficient to have a smaller cooling capacity than with the hitherto usual separate refrigeration chamber which had to be opened and closed.

It is, of course, particularly advantageous if as many sampling bottles as possible and advantageously the bottles of all the member farmers can be arranged in a single box which is utilized as economically as possible. A preferred construction of the box is characterized by the fact that each of the conveyors which are provided has two shafts arranged vertically one above the other and mounted for rotation in the box. Each of the shafts is provided at each of the outer ends with a guide sprocket, and at least one of these shafts is connected to driving means while an endless carrier member is arranged over each of the pairs of guide sprockets which are arranged one above the other, the said carrier member being driven by one or both of the sprockets. The said carrier members carry one or more frames disposed therebetween which, in turn, carry the sampling bottles. The sample extraction device for feeding the samples into the bottle is mounted for lateral displacement on a guide bar or the like which is horizontally spaced from the path along which the bottle frames travel so that the bottles on the moving bottle frame can freely pass the sample extracting device. Nevertheless, the displaceable head of the sample extracting device can be brought with its outlet above an arriving bottle while the frames always maintain the same vertical position when passing the guide sprockets.

In addition, it is preferable to arrange a driving rod parallel to the guide bar on the inner side of the path followed by the bottles to contact and open hingeable sealing flaps supported on the sampling bottles when the bottles pass the sample extracting device. This is advantageous because there is obtained excellent protection against the entry of dust and dirt into the bottles while the speed of travel of the conveyors is not adversely influenced thereby.

The invention is more fully explained by reference to the drawing which shows diagrammatically one embodiment of the arrangement according to the invention by way of example.

Figure 2:
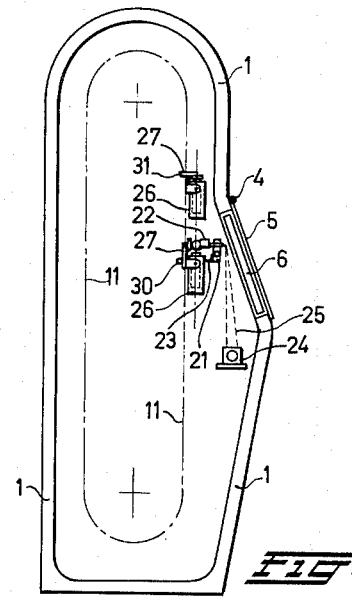

In the drawing:

FIGURE 1 is a side elevational view of the interior of the box showing the arrangement of elements disposed therein in diagrammatic fashion, and FIGURE 2 is a vertical cross-section of the box of FIGURE 1 in which, for the sake of simplicity, only two bottle frames are shown, the sample extracting device being arranged above one of the sampling bottles.

A refrigeration unit 3 driven by an electric motor 2 is arranged in an enclosure defined by a box 1 of the apparatus, which box can be sealed in air-tight manner. The refrigeration plant maintains the interior of the box 1 at a suitably chosen low temperature and, after closing the inlet to the box 1, the interior of the latter can be constantly maintained at this temperature. This inlet is closed in air-tight manner by means of a closure cover or plate 5 secured by a hinge 4 on the outer side of the box 1. This closure plate 5 is provided with an inspection window 6 which has the same thickness as the wall of the box 1, the said thickness being determined by the degree of heat insulation which is desired for the box. The closure plate 5 with the inspection window can extend along practically the entire length of the box 1, whereby the operator is able easily to see inside the box along the entire length.

Horizontal shafts 8 are rotatably mounted in bearings 7 in the box 1, with one shaft positioned in the upper portion of the box and the other shaft being positioned in the lower portion of the box. Fixedly mounted on the upper shaft 8 near each of the outer ends thereof is a driving sprocket 9, while the lower shaft 8 has guide sprockets 10 secured thereto at the outer ends thereof in vertical alignment with the sprockets 9. An endless carrier chain 11 is placed around each pair of corresponding vertically disposed sprockets 9 and 10. The shafts, sprockets and chains constitute conveyor means for the bottles. The upper shaft 8 is driven by an electric motor 12 through a transmission gear 13 to, in turn, drive the two carrier chains 11. The electric motor 14 is connected through a transmission gear 15 to a friction clutch plate 17 mounted on one side in a bearing 16, it being possible for the said plate 17, through a friction clutch sleeve 18, to drive in rotation the horizontal driving worm 20 which is rotatable in bearings 19. The bearings 7 and 19 are supported in the box 1 in a manner which is not shown, and this also applies as regards the electric motors 2, 12 and 14. Such details are clearly within the knowledge of a man skilled in the art. The electric motors 12, 14 receive electrical power through conduits (not shown) extending through the box 1 in air-tight manner.

Sampling means constituted by a sampling head 22, which can be driven by the worm 20, travels along the said worm by means of a carrier 21, so that the said head 22 can be displaced horizontally between the two carrier chains. The carrier 21 is supported against a guide bar 23 and slides along this bar (see FIG. 2). The illustration of the bar has been omitted from FIG. 1 for the sake of clarity. The details of the sampling head can be disregarded here, since these details have no connection with the invention and are readily known by one skilled in the art. It is sufficient to state that a quantity of milk can be supplied to the sampling head 22 from outside the box through an inlet valve 24 and a tube system 25 which is only diagrammatically indicated. The sampling head extracts a portion of the quantity of milk and, at the same time, the sampling head is laterally brought to a position above the particular sampling bottle 26 to be filled which has already been moved to a filling station at a level just beneath the level of the sampling head. The hingeable sealing flap 27 of said bottles are opened upon upward movement of the bottles to the level of the filling station, as will hereinafter be more fully explained. During the time when the sampling head 22 is situated above the open sampling bottle 26 to be filled, the milk sample is introduced into the said bottle, whereafter the sampling head 22 is again moved to free the path for movement of the said bottles 26.

The sampling bottles 26 are supported in a row in a bottle frame 28. Only one sampling bottle has been shown in FIG. 1, the remainder being indicated by chain-dotted lines. The frames 28 are suspended by means of journals 29 at their ends so as to be rotatable on links of the carrier chains 11. With a proper adjustment of these bottle frames 28, they all are horizontally suspended and extend parallel to one another between the two chains while the bottles 26 supported therein constantly are maintained in a vertical position as the chains revolve. Only a single bottle frame has been shown in FIG. 1 but it will be appreciated that a plurality may be provided. By causing the chains 11 to revolve in a counter-clockwise direction, the frames 28 are regularly advanced upwardly past the position at which are located the driving worm 20, the guide bar 23 and the sampling head 22. A driving rod or bar 30 is disposed parallel to the guide bar 23 but is located on the inner side of the path followed by the frames 28. Consequently, when a frame with sampling bottles is raised to the level of the filling station, the driving rod 30 contacts the lip 31 of the sealing flap 27 on each sampling bottle to open these hingeable sealing flaps. Upon continued upward movement of the frame, the lips 31 of the sealing flaps 27 are freed from the driving rod 30, whereby the sealing flaps are again closed. If desired, a spring may be connected to the sealing flaps urging the same closed.

The operation of the device is as follows:

At the commencement of a collecting period, all the frames in the box 1 are filled with sampling bottles 26 which are suitably marked. The box 1 is thereafter closed in air-tight manner. The closure plate 5 is provided with a lock, so that only the key holder is able to open the box again. The electrical supply system of the box 1 is connected to the external mains and the refrigeration unit is driven. A quantity of milk furnished by a first farmer is poured into a collecting container outside the box and is supplied through a tube system to the inlet valve 24 arranged in the box 1 and then to the sampling head 22. By operating the electric motors 12 and 14 from outside the box 1, the bottle frame 28 carrying the bottle corresponding to the first farmer is brought to the filling station and the sampling head 22 is then laterally displaced along worm 20 to the position over the sampling bottle bearing the marking for the farmer concerned. The milk sample in head 22 is then discharged into the bottle, whereafter the milk supplied by the first farmer is conveyed to a common collecting tank. The next farmer's milk is then received in the collecting container after the latter has been emptied of the previous farmer's milk. The sampling bottle of the next farmer and the sampling head are brought into position for a filling operation and the sample of his milk is then discharged into his bottle. The process is then repeated for all the farmers furnishing milk. The sampling head is flushed after each sample has been fed into its proper bottle. The correct position of the sampling head relative to a specific sampling bottle in a frame can be observed through the inspection window 6. Furthermore, the transmission gears 13 and 15 can be so designed that the movements of the carrier chains 11 and of the carrier 21 through the driving worm can be accurately adapted, on the one hand to one or several times the spacing between two bottle frames 28 and on the other to one or several times the spacing between two sampling bottles in one frame 28.

If desired, the box 1 may be supported on a vehicle so as to be movable from place to place.

It is obvious that numerous modifications and variations can be made within the scope of the invention as defined by the appended claims.

What is claimed is:

1. Apparatus for filling bottles with samples of liquids, said apparatus comprising: an airtight box including a closable cover, a pair of shafts vertically aligned in said box, each supported for rotation, said shafts having opposite ends, sprocket wheels secured on the ends of said shafts for rotation therewith, the sprocket wheels on the ends of one of the shafts being in vertical alignment with the sprocket wheels on the ends of the other of the shafts, two carrier chains respectively engaged with the pairs of aligned sprocket wheels for being driven thereby; means supported in said box for driving one of the shafts whereby the sprocket wheels and carrier chains are also driven, a plurality of bottle frames, pivotally supported from the carrier chains horizontally in spaced vertical arrangement, said bottle frames each being adapted for supporting a plurality of bottles in suspended vertical arrangement, said bottle frames all advancing with said carrier chains for passage along a closed path, a sampling head lying in the path of travel of the bottles and supported for travel in opposite directions along a horizontal path parallel to said frames, said sampling head being movable to a lateral position beyond the path of the bottles to enable passage therepast of the carrier frames and the bottles thereon, means for delivering a liquid sample to said sampling head which sample is correlated with one of the bottles which is to be filled with the sample, said carrier chains and bottle frames being stopped as the bottle frame supporting the bottle to be filled is located at a filling station at a level just beneath the sampling head, said sampling head then being advanced to a position in vertical alignment with the bottle to be filled whereafter the liquid sample in said sample head may be discharged into the correlated bottle, pivotable sealing flaps on said bottles each having a lip protruding beyond the associated bottle and a driving rod secured in said box extending parallel to the bottles and lying in the path of the lips of the sealing flaps, said driving rod being at a level in said box for contacting and opening the sealing flaps of the bottles of the carrier frame as the latter reaches the filling station, said sealing flaps being free of the driving rod as the bottle frames advance beyond the filling station to permit the sealing flaps to close.

2. Apparatus for filling bottles with samples of liquids, said apparatus comprising: an airtight box, a sealable cover pivotally supported on said box and provided with a window, a pair of shafts vertically aligned in said box, each supported for rotation, said shafts having opposite ends, sprocket wheels secured on the ends of said shafts for rotation therewith, the sprocket wheels on the ends of one of the shafts being in vertical alignment with the sprocket wheels on the ends of the other of the shafts, two carrier chains respectively engaged with the pairs of aligned sprocket wheels for being driven thereby, means supported in said box for driving one of the shafts whereby the sprocket wheels and carrier chains are driven, a plurality of bottle frames, journals pivotally supporting each of the bottle frames from the carrier chains horizontally in spaced vertical arrangement, said bottle frames each being adapted for supporting a plurality of bottles in suspended vertical arrangement, said bottle frames all advancing with said carrier chains for passage along a closed path, a horizontal worm gear supported in said box outside the path of travel of the bottles in the bottle frames, means supported in said box for independently driving the worm gear, a sampling head lying in the path of travel of the bottles and supported on said worm gear for travel therealong as said worm gear is rotated, said sampling head being movable in opposite direction as the worm gear is driven in opposite directions, said worm gear having ends extending laterally beyond the path of the carrier frames whereby the sampling head may be brought to either end of the worm gear to enable passage therepast of the bottle frames and the bottles thereon, means for delivering liquid samples to said sampling head from outside said box, which samples are correlated with the bottles, said carrier chains and bottle frames being stopped as the bottle frame supporting the bottle to be filled is at a filling station located at a level just beneath the sampling head, said worm gear then being driven to advance the sampling head to position in vertical alignment above the bottle to be filled whereafter the liquid sample in said carrier head may be discharged into the correlated bottle, pivotable sealing flaps on said bottles each having a lip protruding beyond the associated bottle and a driving rod secured in said box and extending parallel to the worm gear in the path of the lips of the sealing flaps, said driving rod being at a level in said box for contacting and opening the sealing flaps of the bottles of a bottle frame as the latter reaches the filling station, said sealing flaps being free of the driving rod as the associated bottle frame advances beyond the filling station to permit the sealing flaps to close.

3. Apparatus as claimed in claim 2 wherein said worm gear and driving rod lie on opposite sides of the bottles.

4. Apparatus as claimed in claim 2 comprising refrigeration means in said box and means in the box for independently driving the refrigeration means.

References Cited by the Examiner
UNITED STATES PATENTS 2,779,357    1/1957    Stonestreet et al. _____ 141—82

LAVERNE D. GEIGER, *Primary Examiner.*

S. BELL, *Assistant Examiner.*